(12) United States Patent
Baghdassarian et al.

(10) Patent No.: US 12,063,392 B2
(45) Date of Patent: *Aug. 13, 2024

(54) DATA REPOSITORY FOR SPORTS AND ENTERTAINMENT INFORMATION

(71) Applicant: TFCF DIGITAL ENTERPRISES, INC., Los Angeles, CA (US)

(72) Inventors: Patrick Baghdassarian, Glendale, CA (US); Satoe Kawashima, Los Angeles, CA (US); Steven E. Simonian, Los Angeles, CA (US)

(73) Assignee: TFCF Digital Enterprises, Inc., Los Angeles, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/103,417

(22) Filed: Jan. 30, 2023

(65) Prior Publication Data

US 2023/0171440 A1 Jun. 1, 2023

Related U.S. Application Data

(63) Continuation of application No. 14/828,249, filed on Aug. 17, 2015, now Pat. No. 11,595,702.

(60) Provisional application No. 62/038,165, filed on Aug. 15, 2014.

(51) Int. Cl.
*H04N 21/2187* (2011.01)
*H04N 21/231* (2011.01)
*H04N 21/431* (2011.01)
*H04N 21/6547* (2011.01)
*H04N 21/81* (2011.01)

(52) U.S. Cl.
CPC ... *H04N 21/2187* (2013.01); *H04N 21/23109* (2013.01); *H04N 21/431* (2013.01); *H04N 21/6547* (2013.01); *H04N 21/8133* (2013.01)

(58) Field of Classification Search
CPC .................................................. H04N 21/2187
See application file for complete search history.

(56) References Cited

U.S. PATENT DOCUMENTS

2014/0232863 A1* 8/2014 Paliga ................ H04N 21/4431
348/143

* cited by examiner

*Primary Examiner* — Michael R Telan
(74) *Attorney, Agent, or Firm* — Farjami & Farjami LLP

(57) ABSTRACT

A method, system, apparatus, and computer program product provide/deliver information during a live broadcast. Information feeds (that include attributes and values) are ingested via a plug-in architecture, into an application server. The application server drives the information feeds into a database, and distributes the attributes to a web server. The web server exposes, using a web service, the attributes clients. The web service enables clients to select a set of the attributes and configure, for visual display, the values corresponding to the selected set of the attributes. The values are composited in real-time, based on the configuration, with live audio-video content. The composited elements and live audio-video content are broadcast/streamed live.

20 Claims, 10 Drawing Sheets

DATA REPOSITORY FOR SPORTS AND ENTERTAINMENT INFORMATION

BACKGROUND OF THE INVENTION

1. Field of the Invention

The present invention relates generally to data repositories, and in particular, to a method, apparatus, system, and article of manufacture for a sports and entertainment information data repository that is used to drive on-air as well as on-line applications.

2. Description of the Related Art

During the live (i.e. real-time) broadcast of various events (e.g., sporting and entertainment events such as football games, baseball games, concerts, awards shows, red-carpet coverage, etc.), it is desirable to have access to a plethora of information and statistics. Such information and statistics may be desired for use by on-air personalities and/or in the form of data feeds (e.g., ticker streams, social media, etc.). Prior art systems fail to provide a flexible and scalable repository that can be used to maintain and provide a variety of types of information to a variety of different applications.

SUMMARY OF THE INVENTION

Embodiments of the invention provide a high-availability and scalable data repository for sports and entertainment information. The repository (referred to herein as DATA-HIVE) is used to drive on-air as well as on-line applications used by a multitude of media content consumers. For example, the repository may be used by a studio sports division (e.g., FOX SPORTS) to drive real-time sports statistics for virtually all graphics applications including a sports ticker, clock and score graphics (referred to as FOX-BOX), lower third graphics, and a "Big Board" on-set virtual screen. The repository receives statistics data from multiple sources and normalizes it for each of the subscribing applications. The repository also provides a plug-in interface that can be used to adapt any data feed as a source. Such sources include wire feeds, RSS (rich site summary or really simple syndication) feeds, XML (extensible markup language) feeds, etc.

Features provided by a data repository may include:
- Object oriented data repository for sports statistics, news, and entertainment information;
- Real-time access to data objects;
- Component based flexible architecture to multiple data sources;
- Extensible plug-in services for virtually unlimited data sources; and
- Unique "Correlation ID" that tracks all objects in the system and relates objects together.

BRIEF DESCRIPTION OF THE DRAWINGS

Referring now to the drawings in which like reference numbers represent corresponding parts throughout:

FIG. 11 is a flow chart illustrating the logical flow for providing information during a live broadcast in accordance with one or more embodiments of the invention.

DETAILED DESCRIPTION OF THE PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Overview

Embodiments of the invention provide a data repository for sports and entertainment information (e.g., dynamic information). The repository is structured based on a document-oriented database (i.e., non-SQL) (e.g., the open source platform available from MONGODB). Further, the repository is highly-available and scalable, thereby enabling real-time sports feeds (e.g., statistics for sports related information). The repository and system further provide a plug-in architecture for data feeds (e.g., RSS, wire, XML, TWITTER, FACEBOOK, etc.). In other words, in addition to standardized feeds (such as RSS, XML, TWITTER, etc.), the plug-in architecture enables data feeds to be pulled in from different non-standard sources such as sports data from OPTA for international soccer, feeds from the NFL, NBA, MLB, etc. The information can be used to drive real-time applications such as on-air graphics, studio touch screens, tickers, social media, logging, digital archive, digital advertising, etc.

Hardware Environment

Figure 1:
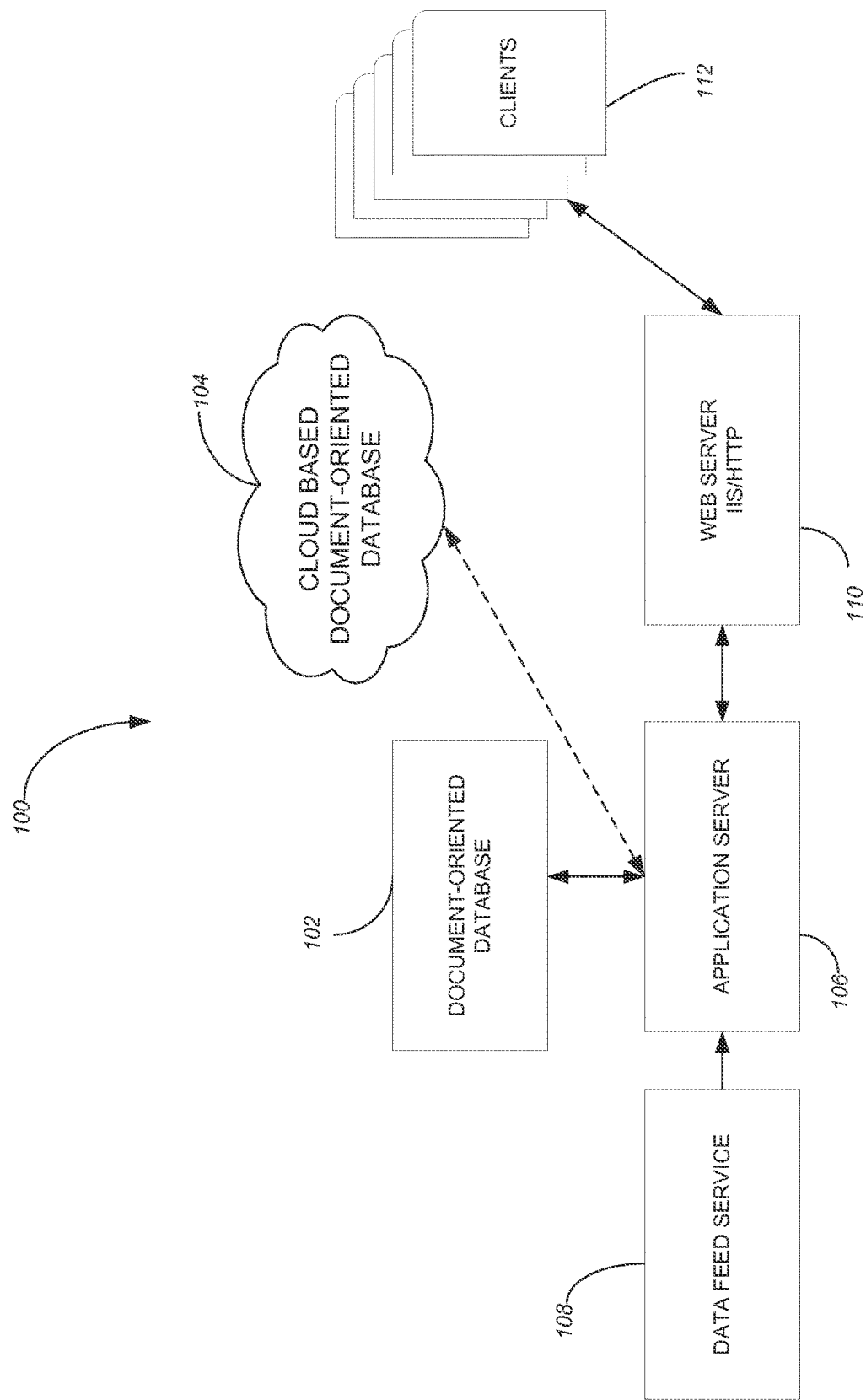
FIG. 1 illustrates a high level architecture of the data repository system and use in accordance with one or more embodiments of the invention.

FIG. 1 illustrates a high level architecture of the data repository system and use in accordance with one or more embodiments of the invention. At a high-level, the system 100 utilizes an on-premises instance of a document-oriented database 102 (e.g., the MONGO 102 database) with an off-premises/cloud based document-oriented database 104

(e.g., the MONGOCLOUD) utilized for backup. An application server 106 (e.g., referred to herein as the DATAHIVE server) is in front of the database 102 that drives information into and out of the repository system 100. Two cloud instances 104 may be utilized (e.g., West coast and East coast for redundancy). The data feed service 108 provides the plug-in architecture that allows different feeds to be pushed into the application server 106 and into the database 102. All of the information (e.g., the data and data feeds) stored within the database 102 is provided via the application server 106 to the web server 110. The web server 110 exposes the data using web services (i.e., internet information services [IIS]) and HTTP (hypertext transfer protocol) as JSON (java script object notation) objects to various clients 112.

Figure 2:
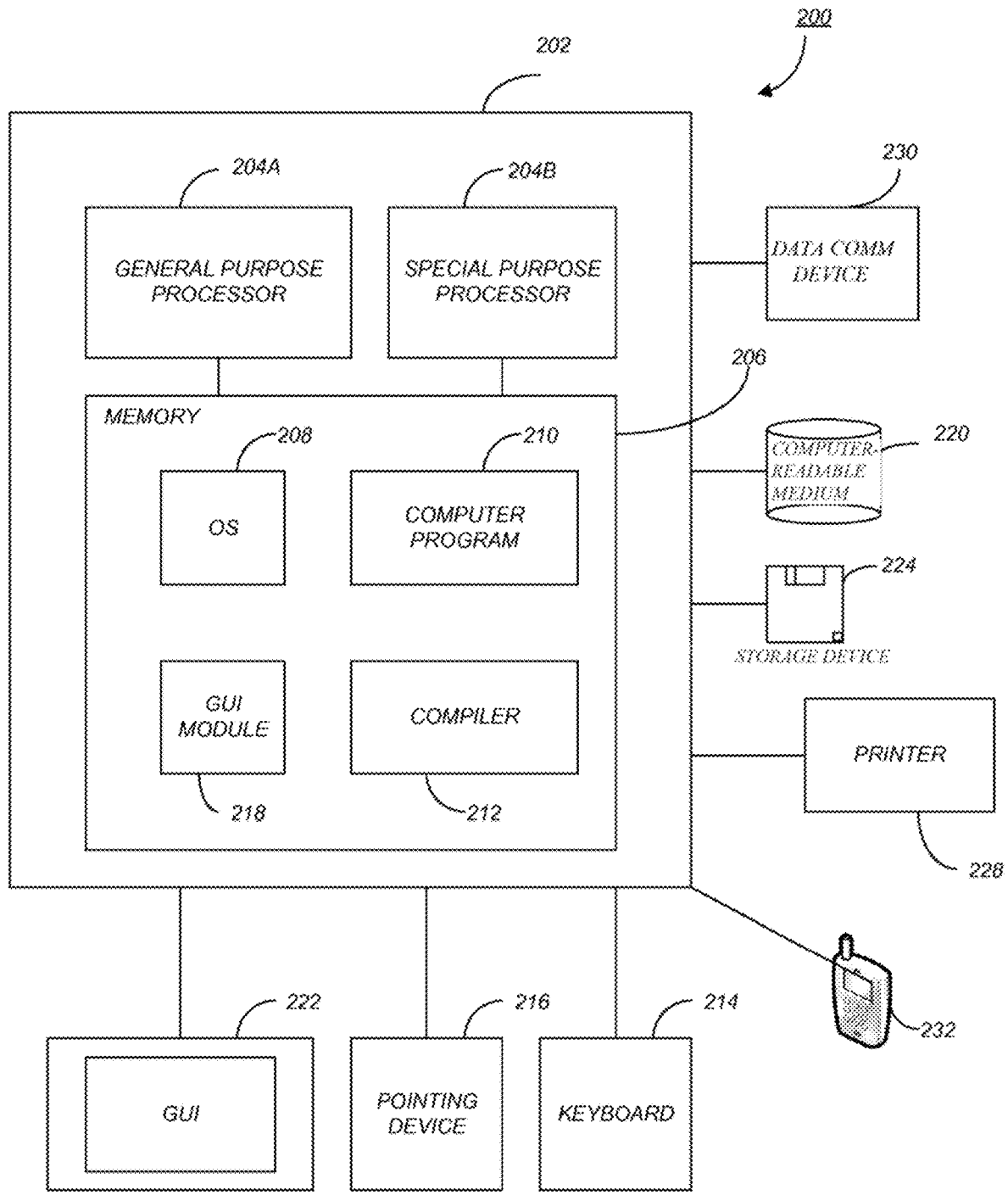
FIG. 2 is an exemplary hardware and software environment used to implement one or more embodiments of the invention.

More specifically, FIG. 2 is an exemplary hardware and software environment 200 used to implement one or more embodiments of the invention. The hardware and software environment includes a computer 202 and may include peripherals. Computer 202 may be a user/client computer, server computer, or may be a database computer. The computer 202 comprises a general purpose hardware processor 204A and/or a special purpose hardware processor 204B (hereinafter alternatively collectively referred to as processor 204) and a memory 206, such as random access memory (RAM). The computer 202 may be coupled to, and/or integrated with, other devices, including input/output (I/O) devices such as a keyboard 214, a cursor control device 216 (e.g., a mouse, a pointing device, pen and tablet, touch screen, multi-touch device, etc.) and a printer 228. In one or more embodiments, computer 202 may be coupled to, or may comprise, a portable or media viewing/listening device 232 (e.g., an MP3 player, IPOD, NOOK, portable digital video player, cellular device, personal digital assistant, etc.). In yet another embodiment, the computer 202 may comprise a multi-touch device, mobile phone, gaming system, internet enabled television, television set top box, or other internet enabled device executing on various platforms and operating systems.

In one embodiment, the computer 202 operates by the general purpose processor 204A performing instructions defined by the computer program 210 under control of an operating system 208. The computer program 210 and/or the operating system 208 may be stored in the memory 206 and may interface with the user and/or other devices to accept input and commands and, based on such input and commands and the instructions defined by the computer program 210 and operating system 208, to provide output and results.

Output/results may be presented on the display 222 or provided to another device for presentation or further processing or action. In one embodiment, the display 222 comprises a liquid crystal display (LCD) having a plurality of separately addressable liquid crystals. Alternatively, the display 222 may comprise a light emitting diode (LED) display having clusters of red, green and blue diodes driven together to form full-color pixels. Each liquid crystal or pixel of the display 222 changes to an opaque or translucent state to form a part of the image on the display in response to the data or information generated by the processor 204 from the application of the instructions of the computer program 210 and/or operating system 208 to the input and commands. The image may be provided through a graphical user interface (GUI) module 218. Although the GUI module 218 is depicted as a separate module, the instructions performing the GUI functions can be resident or distributed in the operating system 208, the computer program 210, or implemented with special purpose memory and processors.

In one or more embodiments, the display 222 is integrated with/into the computer 202 and comprises a multi-touch device having a touch sensing surface (e.g., track pod or touch screen) with the ability to recognize the presence of two or more points of contact with the surface. Examples of multi-touch devices include mobile devices (e.g., IPHONE, NEXUS S, DROID devices, etc.), tablet computers (e.g., IPAD, HP TOUCHPAD), portable/handheld game/music/video player/console devices (e.g., IPOD TOUCH, MP3 players, NINTENDO 3DS, PLAYSTATIONPORTABLE, etc.), touch tables, and walls (e.g., where an image is projected through acrylic and/or glass, and the image is then backlit with LEDs).

Some or all of the operations performed by the computer 202 according to the computer program 210 instructions may be implemented in a special purpose processor 204B. In this embodiment, the some or all of the computer program 210 instructions may be implemented via firmware instructions stored in a read only memory (ROM), a programmable read only memory (PROM) or flash memory within the special purpose processor 204B or in memory 206. The special purpose processor 204B may also be hardwired through circuit design to perform some or all of the operations to implement the present invention. Further, the special purpose processor 204B may be a hybrid processor, which includes dedicated circuitry for performing a subset of functions, and other circuits for performing more general functions such as responding to computer program 210 instructions. In one embodiment, the special purpose processor 204B is an application specific integrated circuit (ASIC).

The computer 202 may also implement a compiler 212 that allows an application or computer program 210 written in a programming language such as COBOL, Pascal, C++, FORTRAN, or other language to be translated into processor 204 readable code. Alternatively, the compiler 212 may be an interpreter that executes instructions/source code directly, translates source code into an intermediate representation that is executed, or that executes stored precompiled code. Such source code may be written in a variety of programming languages such as JAVA, PERL, BASIC, etc. After completion, the application or computer program 210 accesses and manipulates data accepted from I/O devices and stored in the memory 206 of the computer 202 using the relationships and logic that were generated using the compiler 212.

The computer 202 also optionally comprises an external communication device such as a modem, satellite link, Ethernet card, or other device for accepting input from, and providing output to, other computers 202.

In one embodiment, instructions implementing the operating system 208, the computer program 210, and the compiler 212 are tangibly embodied in a non-transitory computer-readable medium, e.g., data storage device 220, which could include one or more fixed or removable data storage devices, such as a zip drive, floppy disc drive 224, hard drive, CD-ROM drive, tape drive, etc. Further, the operating system 208 and the computer program 210 are comprised of computer program 210 instructions which, when accessed, read and executed by the computer 202, cause the computer 202 to perform the steps necessary to implement and/or use the present invention or to load the program of instructions into a memory 206, thus creating a special purpose data structure causing the computer 202 to operate as a specially programmed computer executing the method steps described herein. Computer program 210 and/or operating instructions may also be tangibly embodied in memory 206 and/or data communications devices 230, thereby making a computer program product or article of manufacture according to the invention. As such, the terms "article of manufacture," "program storage device," and "computer program product," as used herein, are intended to encompass a computer program accessible from any computer readable device or media.

Of course, those skilled in the art will recognize that any combination of the above components, or any number of different components, peripherals, and other devices, may be used with the computer 202.

Figure 3:
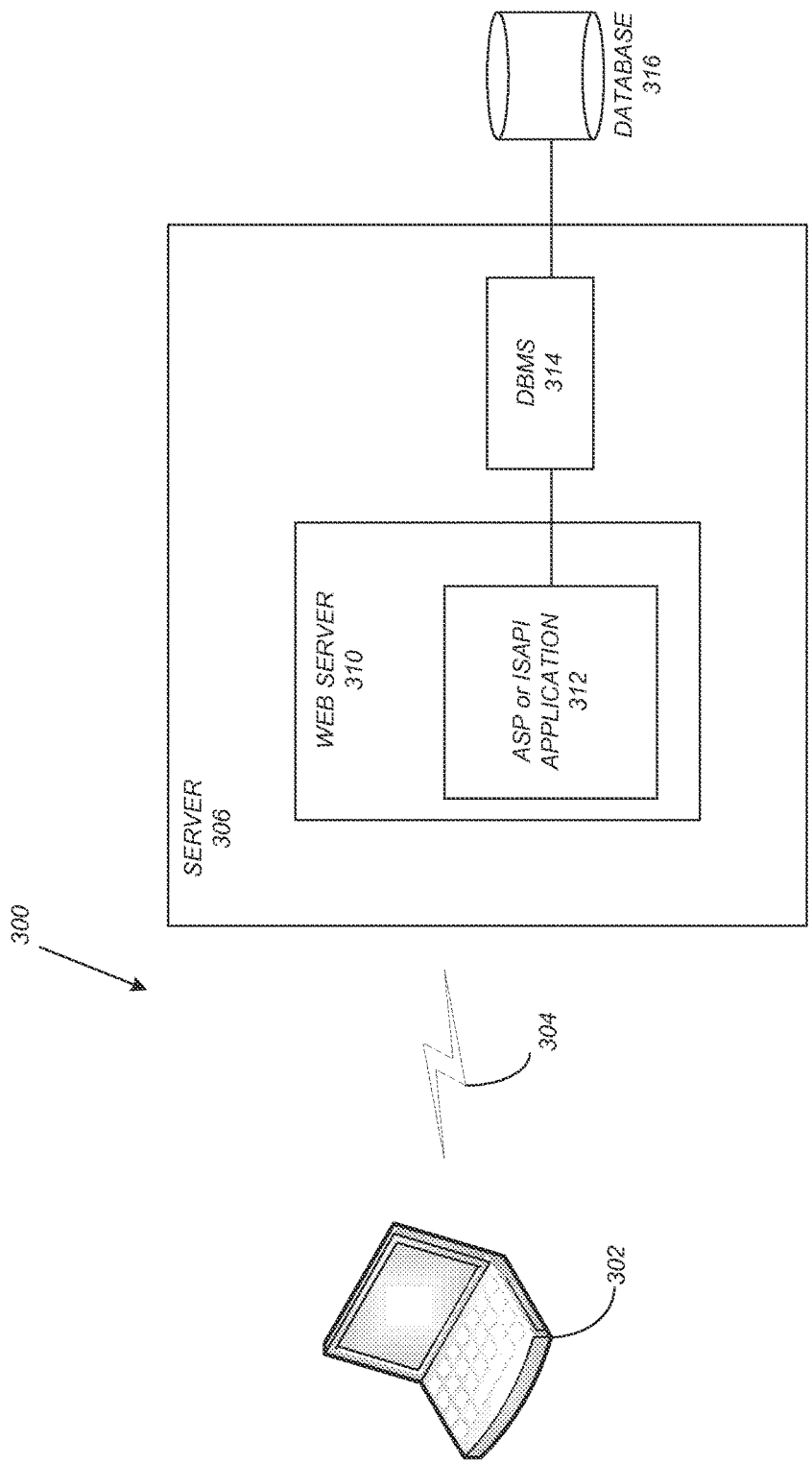
FIG. 3 schematically illustrates a typical distributed computer system using a network to connect client computers to server computers in accordance with one or more embodiments of the invention.

FIG. 3 schematically illustrates a typical distributed computer system 300 using a network 304 to connect client computers 302 to server computers 306. A typical combination of resources may include a network 304 comprising the Internet, LANs (local area networks), WANs (wide area networks), SNA (systems network architecture) networks, or the like, clients 302 that are personal computers or workstations (as set forth in FIG. 2), and servers 306 that are personal computers, workstations, minicomputers, or mainframes (as set forth in FIG. 2). However, it may be noted that different networks such as a cellular network (e.g., GSM [global system for mobile communications] or otherwise), a satellite based network, or any other type of network may be used to connect clients 302 and servers 306 in accordance with embodiments of the invention.

A network 304 such as the Internet connects clients 302 to server computers 306. Network 304 may utilize ethernet, coaxial cable, wireless communications, radio frequency (RF), etc. to connect and provide the communication between clients 302 and servers 306. Clients 302 may execute a client application or web browser and communicate with server computers 306 executing web servers 310. Such a web browser is typically a program such as MICROSOFT INTERNET EXPLORER, MOZILLA FIREFOX, OPERA, APPLE SAFARI, GOOGLE CHROME, etc.

Further, the software executing on clients 302 may be downloaded from server computer 306 to client computers 302 and installed as a plug-in or ACTIVEX control of a web browser. Accordingly, clients 302 may utilize ACTIVEX components/component object model (COM) or distributed COM (DCOM) components to provide a user interface on a display of client 302. The web server 310 is typically a program such as MICROSOFT'S INTERNET INFORMATION SERVER.

Web server 310 may host an Active Server Page (ASP) or Internet Server Application Programming Interface (ISAPI) application 312, which may be executing scripts. The scripts invoke objects that execute business logic (referred to as business objects). The business objects then manipulate data in database 316 through a database management system (DBMS) 314. Alternatively, database 316 may be part of, or connected directly to, client 302 instead of communicating/obtaining the information from database 316 across network 304. When a developer encapsulates the business functionality into objects, the system may be referred to as a component object model (COM) system. Accordingly, the scripts executing on web server 310 (and/or application 312) invoke COM objects that implement the business logic. Further, server 306 may utilize MICROSOFT'S Transaction Server (MTS) to access required data stored in database 316 via an interface such as ADO (Active Data Objects), OLE DB (Object Linking and Embedding DataBase), or ODBC (Open DataBase Connectivity). In one or more embodiments, the database 316 is an object database.

Generally, these components 300-316 all comprise logic and/or data that is embodied in/or retrievable from device, medium, signal, or carrier, e.g., a data storage device, a data communications device, a remote computer or device coupled to the computer via a network or via another data communications device, etc. Moreover, this logic and/or data, when read, executed, and/or interpreted, results in the steps necessary to implement and/or use the present invention being performed.

Although the terms "user computer", "client computer", and/or "server computer" are referred to herein, it is understood that such computers 302 and 306 may be interchangeable and may further include thin client devices with limited or full processing capabilities, portable devices such as cell phones, notebook computers, pocket computers, multi-touch devices, and/or any other devices with suitable processing, communication, and input/output capability.

Of course, those skilled in the art will recognize that any combination of the above components, or any number of different components, peripherals, and other devices, may be used with computers 302 and 306.

In view of the above, and referring again to FIG. 1, the DATAHIVE refers to the central server 106 that supports the ingestion and distribution of all data feeds (from data feed services 108) to support a sports and entertainment programming channel (e.g., FS1). From a client 112 perspective, the interface (to the data) is a RESTful (Representational State Transfer) JSON API (application programming interface) (e.g., provided via web server 110). The server 106 may also be installed in two or more locations (e.g., on the West coast and the East coast of the United States) (e.g., to drive information into and out of the databases 102/104 located in such locations).

The application server 106 runs on top of a standard IIS web server 110 with a cloud-based database 104 back-end. The data processing is built into a singular WINDOWS service that can be restarted if necessary.

Software Embodiments

Based on the above architecture and hardware, embodiments of the invention provide an object oriented and dynamic schema for sports, news and entertainment data. Referring again to FIG. 1, every data object may be stored in the database 102 as an object (e.g., an object-oriented object) and that object is associated with an object (e.g., an object-oriented object) in the application server 106. Accordingly, there is a one-to-one relationship and it is easy to develop because there is no sophisticated queries within the database 102 (e.g. no multiple queries or join SQL commands).

The data objects are structured within database 102 as a hierarchical data model (parent-child relationships). Accordingly, each object (e.g., a base object) can be taken at a high/low level and will inherit properties and capabilities from its parent object. In addition, system 100 provides a component based flexible architecture for multiple data sources. In other words, there are different layers that support different applications. For example, one layer may be specific to on-air applications (e.g., a ticker) while other layers may enable use for social media and or TWITTER. Each data stream is considered a collection of objects within the DATAHIVE architecture—allowing each to be turned-on or off. In addition, each data stream can be integrated into any application such as a Ticker or Social Media as well as be part of a graphical layer within each application. This allows specific objects to be displayed in the video such as network logo bugs, tickers, snipes or other lower-third type graphics. The system can support unlimited layers for additional flexibility.

The plug-in data feed service 108 is extensible for virtually unlimited numbers and types of data sources (i.e., the plug-in architecture enables the use of different data feeds such that unlimited data sources can be utilized).

A correlation identification (ID) tracks all objects in the system and relates objects together. In this regard, the correlation ID identifies each object and each object's parent (and their relationship with each parent). The application server 106 generates and maintains the correlation ID. In addition, an identifier may be stored in the database 102 but embodiments of the invention may not utilize such identifiers due to the difficulty in traversing such objects within the database 102 (as each ID is stored in a separate object). Accordingly, the correlation ID is stored within the application server 106 and may be used to represent and traverse the hierarchical relationship of the objects (e.g., in an object database). Further, as all of the information about the objects are stored in one location, there is no need to perform queries across multiple tables.

Further to the above, the repository system 100 provides parallel and distributed processing for multiple read/write transactions. In other words, there are multiple instances of the database 102 (e.g., the backup cloud database 104 on the east and west coasts) that can be used to enable parallel processing.

End-uses of the repository system 100 include on-air applications as well as production systems. For example, sports statistics and play-by-play information (e.g., input by personnel watching/monitoring a game/event) is stored within the database 102 and can be used to drive both on-air applications and production system. Thus, instead of requiring a user to manually reenter/type information into the system, a single input of the information is stored in the database 102 and used to drive applications. Further, in addition to monitoring in-game activity, environmental/surrounding information may also be served by the repository system 100. For example, if a fire, flood, etc. is occurring in a field adjacent to a stadium (e.g., an event unrelated to the actual event itself), such editorial content/information may also be stored in database 102 and used to drive applications.

Benefits

The repository system 100 provides a multitude of benefits to both users and consumers. The dynamic schema design allows for flexible storage of all data types (e.g., statistics as well as editorial content). Further, the hierarchical data model supports inheritance/reuse (e.g., reuse of the data objects). The architecture is open-source and hence free. Further, multi-platform support is provided in the form of drivers for multiple operating systems and programming languages (e.g., thereby supporting linux, windows, apple, etc.). The architecture also enables the objects to be persisted as they are represented in the source code (e.g., the relationships thereby simplifying development). In addition, there is no need to create a table that mirrors the data models (e.g., based on the use of the correlation ID).

Further to the above, the architecture is scalable to thousands of transactions per second. Such scalability enables the repository to drive multiple programming channels (e.g., FS1, FOX SPORTS WEST, FOX SPORTS SOUTH, etc.) as well as studios (e.g., on-air applications such as an on-set LCD display) simultaneously and dynamically in real-time.

Data Model

Figure 4:
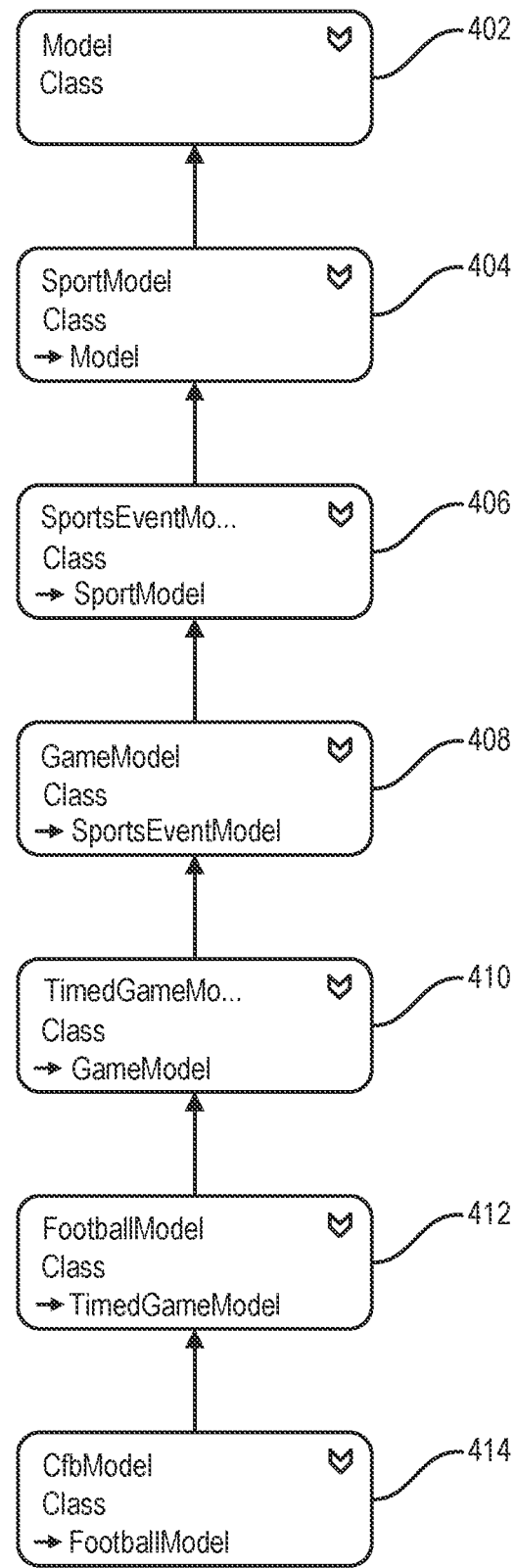
FIG. 4 illustrates an exemplary hierarchical data model that can be used to represent data objects within the database in accordance with one or more embodiments of the invention.

FIG. 4 illustrates an exemplary hierarchical data model that can be used to represent data objects within the database 102 in accordance with one or more embodiments of the invention. The object/data model is hierarchically structured such that every data object has a common root that is generic enough to represent all forms of data in the database 102. For example, data for team standings, leaders, and scores are inherited from a base sports object.

As illustrated, the base model is the model class 402. The sport model 404 is based on the model class 402, and the sports event model 406 is based on the sport model 404. Similarly, from parent to child, the objects are game model 408, timed game model 410, football model 412, and Cfb model 414.

Exemplary Graphical User Interfaces

Figure 5:
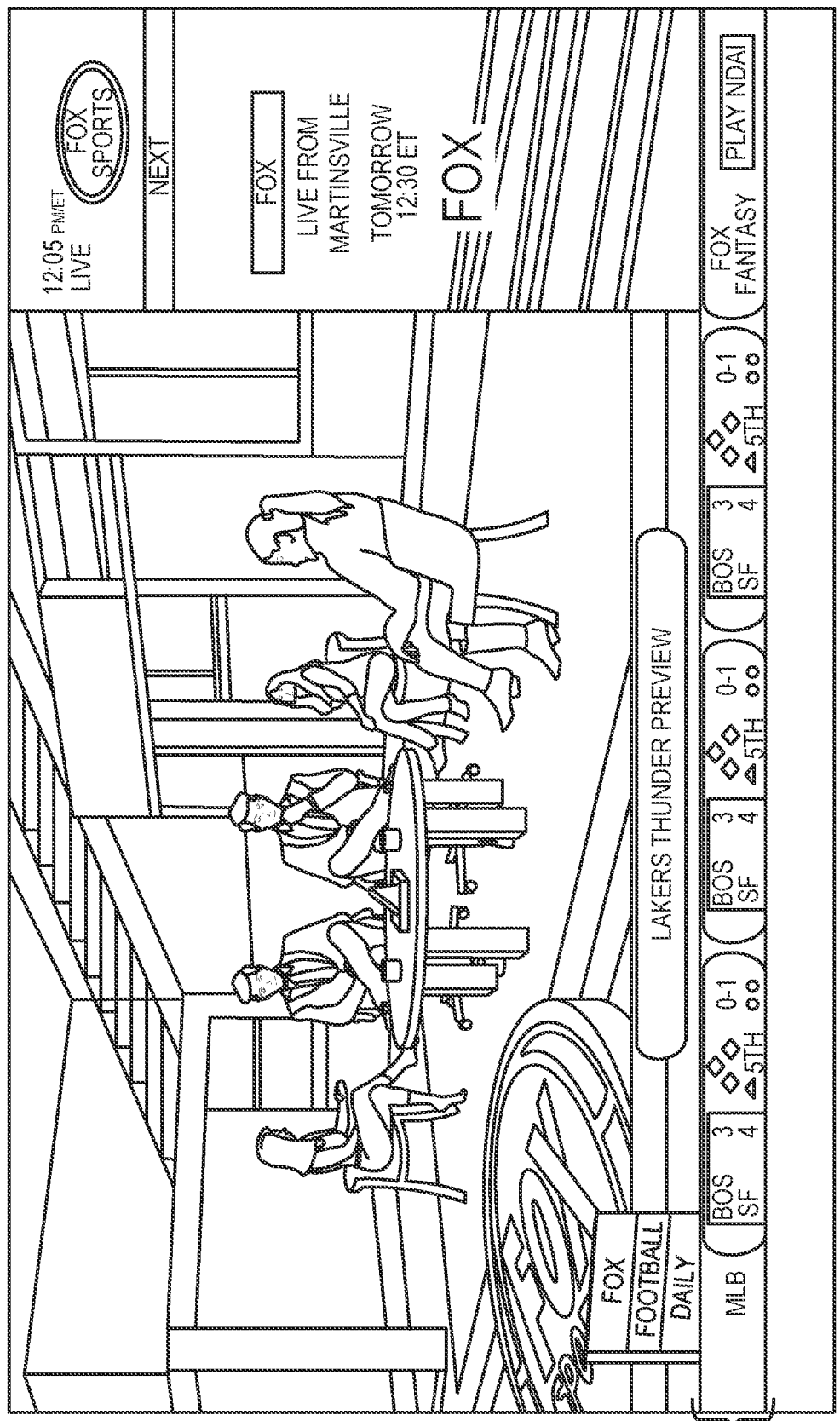
FIG. 5 illustrates a live ticker in accordance with one or more embodiments of the invention.
Figure 6:
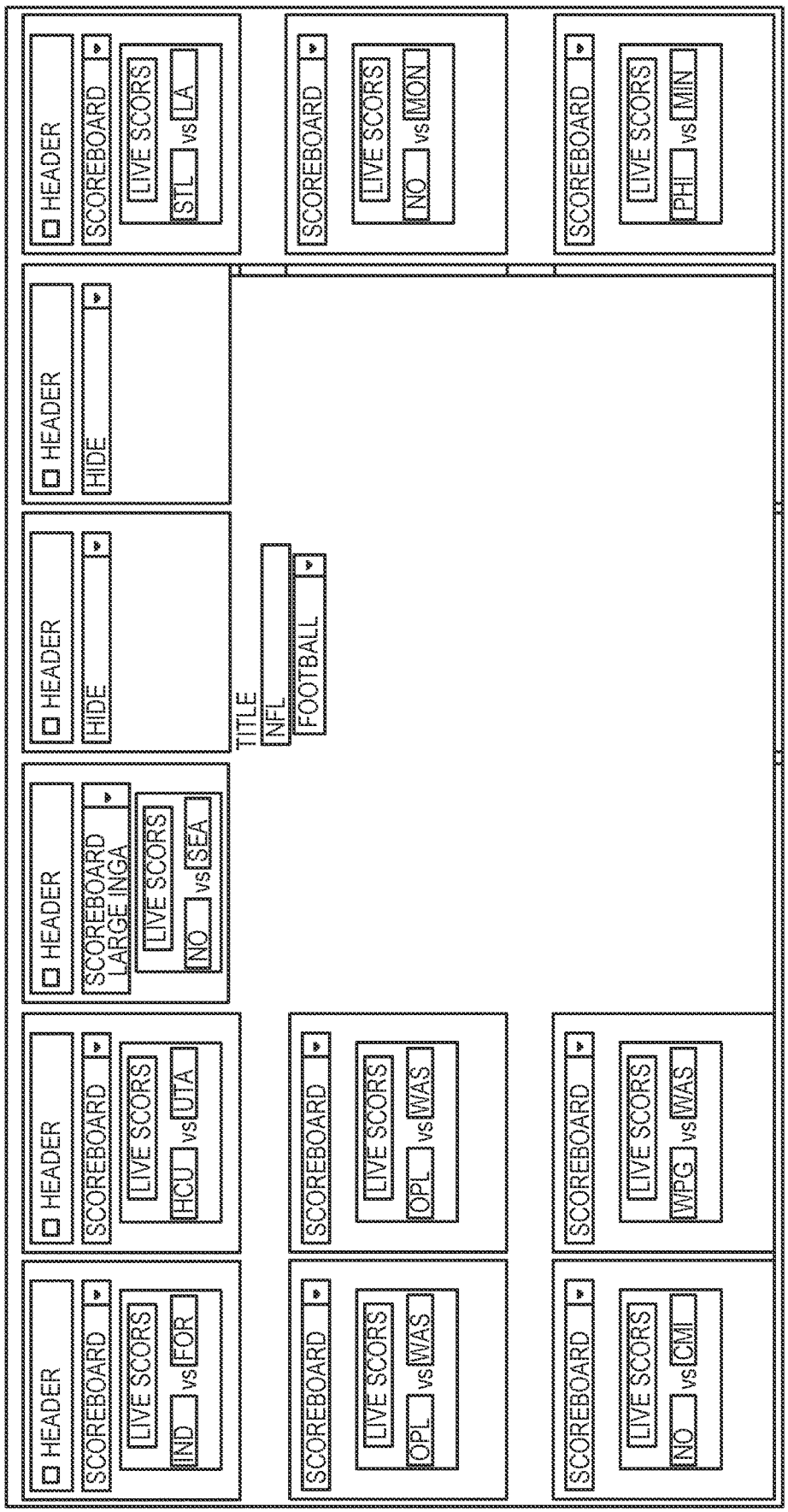
FIG. 6 illustrates a graphics user interface that can be used to configure a display of the data information in the repository (e.g., identifying the screen location and the information to be shown at each location) in accordance with one or more embodiments of the invention.
Figure 7:
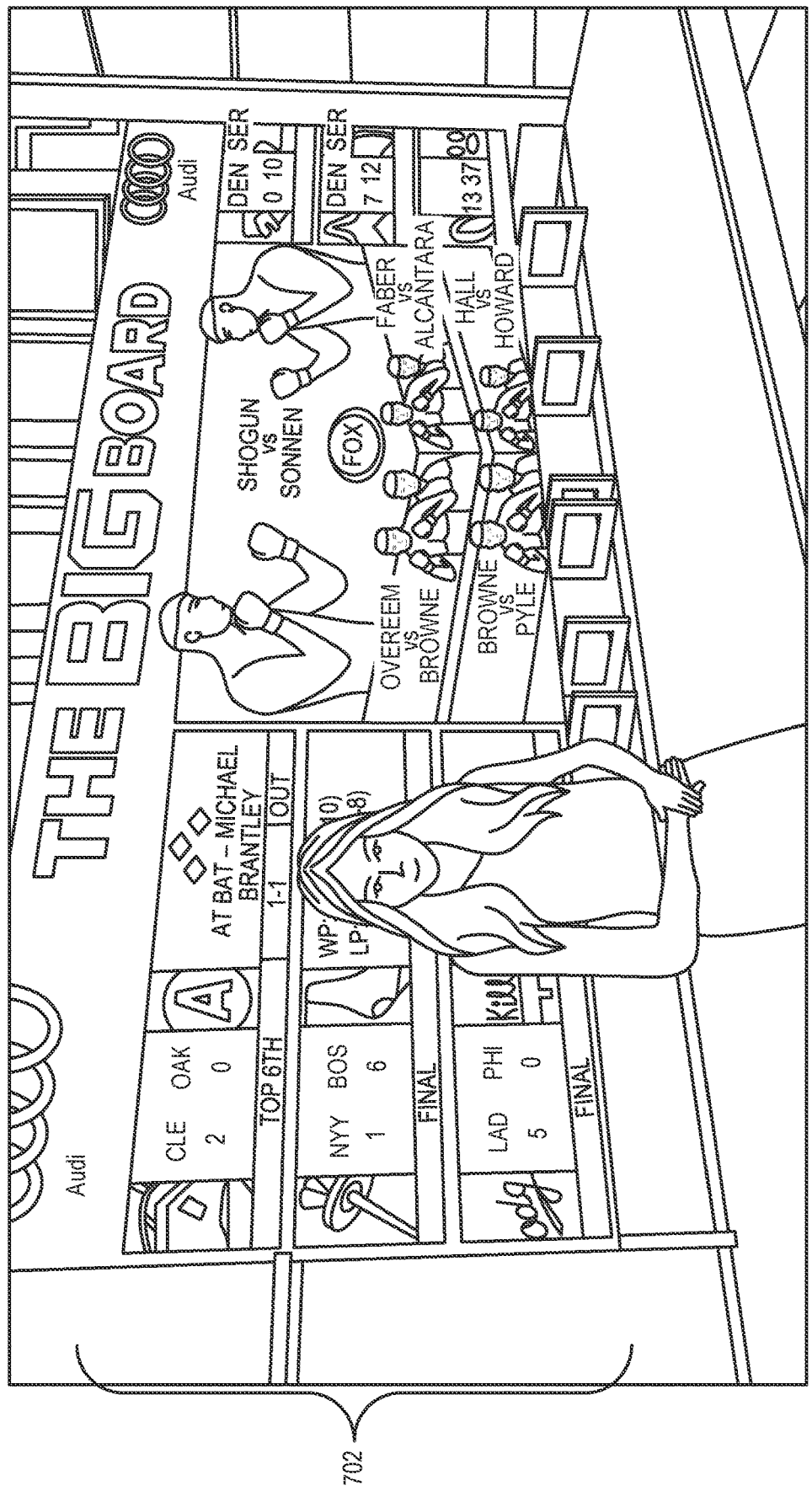
FIG. 7 illustrates a large LCD screen displaying various sports statistics and information driven by the data repository in accordance with one or more embodiments of the invention.
Figure 8:
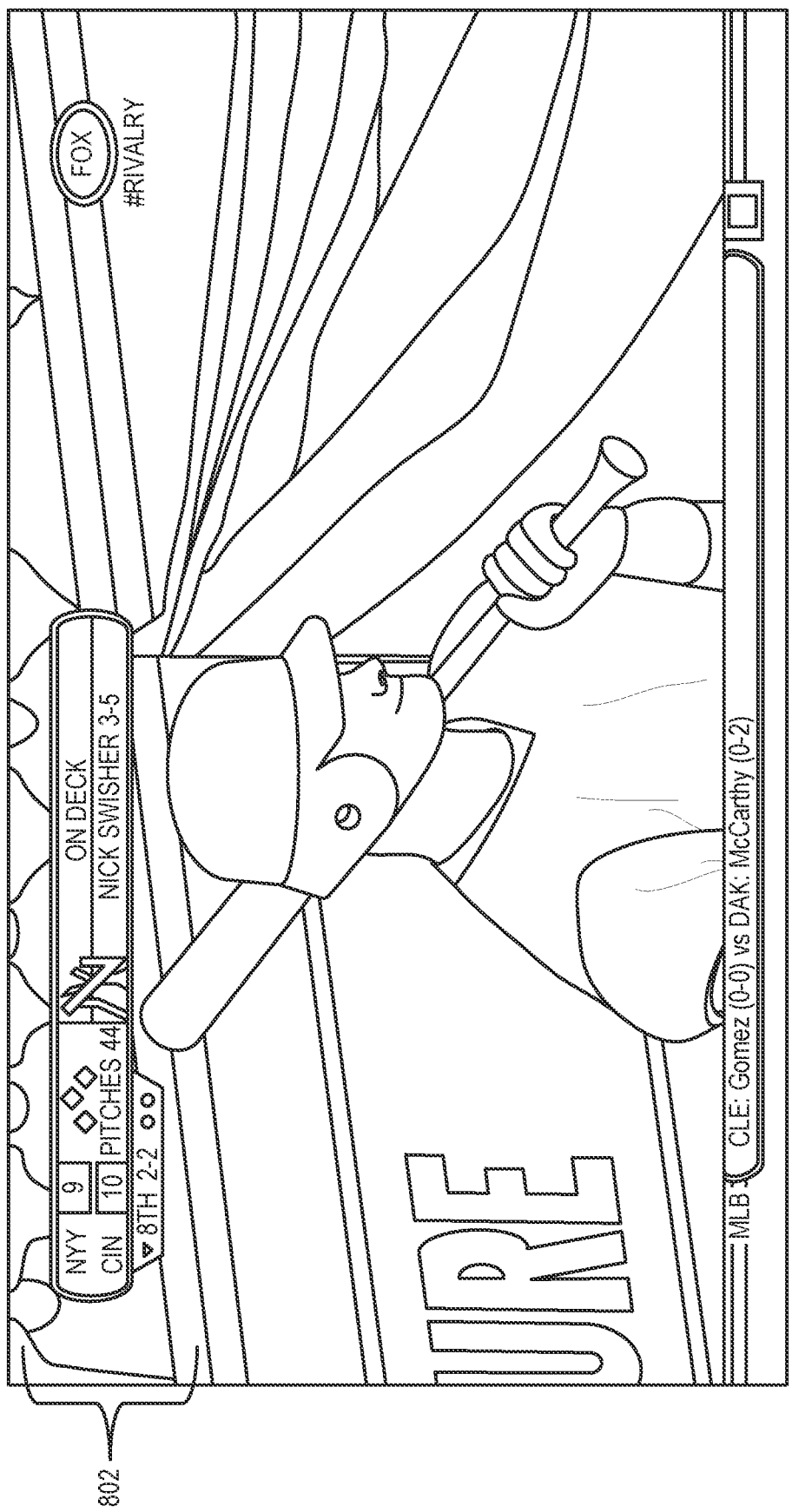
FIG. 8 illustrates the clock and score driven by the data repository in accordance with one or more embodiments of the invention.

FIGS. 5-8 illustrate exemplary graphical user interfaces that can be driven by the data repository in accordance with one or more embodiments of the invention. FIG. 5 illustrates the live ticker 502. FIG. 6 illustrates a graphics user interface that can be used to configure a display of the data information in the repository (e.g., identifying the screen location and the information to be shown at each location). The user can configure whether or not to display the information (e.g., by selecting scoreboard, scoreboard large ingame, hide, etc.). Further, the user can view the live scores available for the teams specified (all for an NFL graphical user interface). FIG. 7 illustrates a large LCD screen (referred to as the BIG BOARD) displaying various sports statistics and information 702 driven by the data repository. FIG. 8 illustrates the clock and score 802 driven by the data repository.

Ticker

As described above and illustrated in FIG. 5, embodiments of the invention may utilize the data repository to drive a ticker 502. Such a ticker 502 can be used to present a variety of data in a variety of different sports. In other words, the ticker 502 is the control application that drives a ticker scene. The ticker 502 connects to the DATAHIVE server 106 for live data and may also connect to an SQL ticker database for content that is created by a ticker production staff (e.g., playlists, notes, alerts, etc.). The ticker application may be driven through various applications (e.g., automation applications from SNELL) via a serial port on a real-time compositing/rendering engine (e.g., the VIZRT Engine available from VIZRT).

Figure 9:
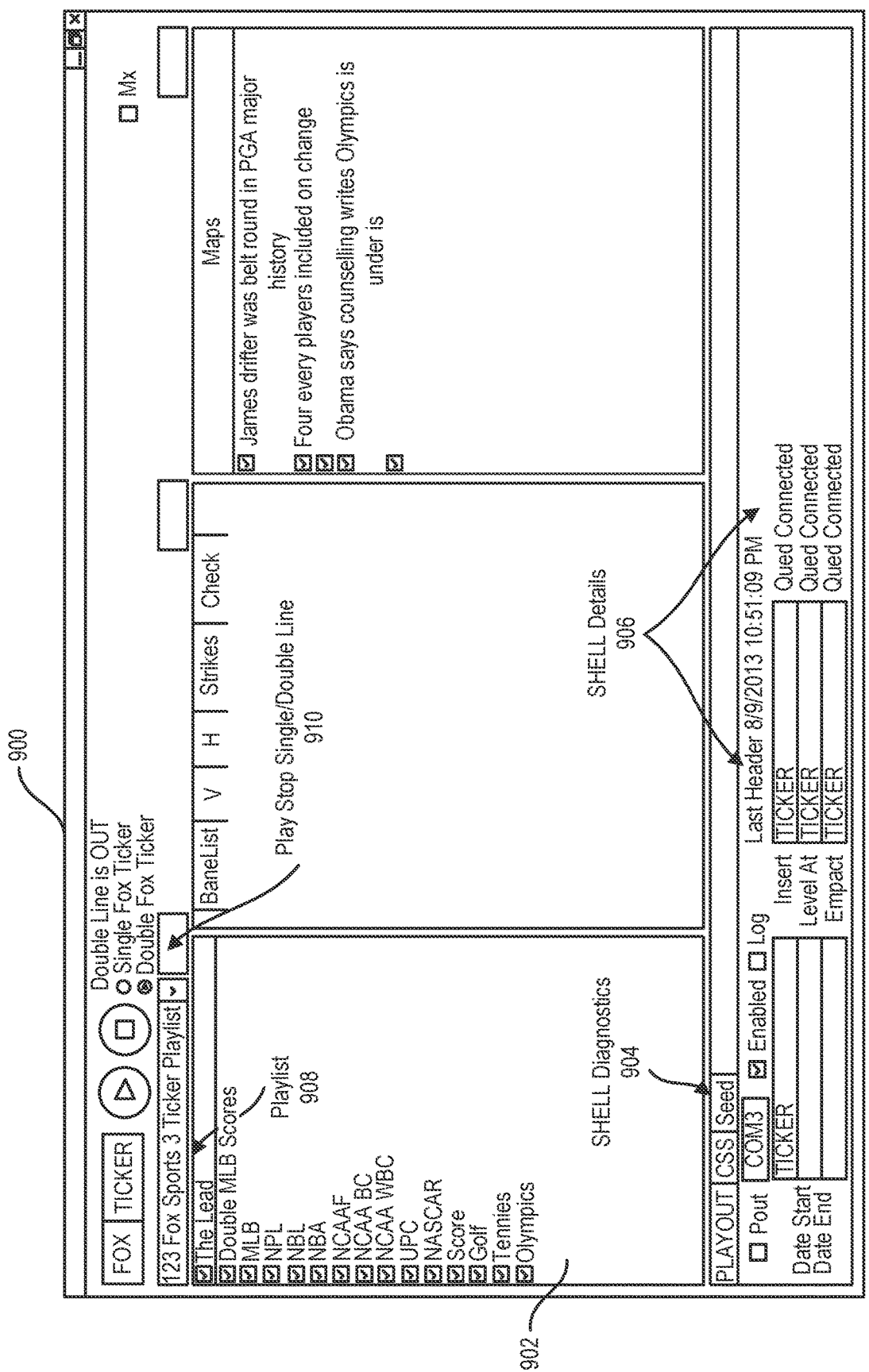
FIG. 9 illustrates an exemplary graphical user interface that may be used to configure a ticker in accordance with one or more embodiments of the invention.

FIG. 9 illustrates an exemplary graphical user interface (GUI) 900 that may be used to configure a ticker in accordance with one or more embodiments of the invention. As illustrated, the GUI 900 may provide diagnostics 904 and details 906 from an automation application (e.g., SNELL diagnostics and/or SNELL details). Further, the user can specify a ticker playlist 908 (e.g., that identifies a predefined/preselected list of items to be displayed) or may specify individual items to be displayed (e.g., by placing checkboxes next to the desired tickers/ticker templates within selection window 902). Further, the GUI 900 may be used to identify whether to play/stop a single/double line in the ticker 502 (e.g., using radio buttons 910).

Races

As an example, the ticker 502 may be utilized in races (e.g., indycar, nascar, formula 1, bicycle, motorcycle, etc.). In such races, the ticker 502 may provide a list of the leaders (e.g., overall for the season and/or for a particular race). Such leader lists may be based on a general leader list template or may be configured for each particular race/type of race.

Tennis

The ticker 502 may also be utilized in tennis. Scores for the top 16 players in a grand slam tournament may be automated based on the information in the data repository. Scores may be displayed based as follows: (1) First Name Last Name def (2) First Name Last Name, 6-3, 6-3. A Header template may be the tournament name where an editorial group may have the ability to edit the tournament name text (e.g., within a sports data management system). The fields in the header may be set forth as follows:

Field #1=Winning player's seed number (seeds are 1-16)
Field #2=Winning player's first name and last name
Field #3="def" (for "defeats")
Field #4=Losing player's seed number (seeds are 1-16)
Field #5=Match score If a match is suspended overnight, a particular time may be used to determine the stats to be used for a particular day (e.g., a "new day" for a tournament may start at 11 PM PDT.

Specific configurations and parameters may be used for particular scenarios and/or tournaments. For example, with respect to match scores, Grand Slam tournaments (Australian Open, French Open, Wimbledon and U.S. Open) are best 2-out-of-3 sets for the Ladies, which means a maximum of three set scores should be available to be displayed, and the best 3-out-of-5 sets for the Gentlemen, which means a maximum of five set scores should be available to be displayed.

Similarly, with respect to tiebreaker scores, tiebreakers may be included in parenthesis with no space after the 7-6 set score. If the winning player's tiebreaker score is 7, the loser's tiebreaker score may be used in parenthesis, such as: 7-6(4). As an example: "(1) Rafael Nadal def (3) Roger Federer, 6-3, 6-3, 7-6(5)". If the winning player's tiebreaker score is above 7, the winner's tiebreaker score may be used, such as: 7-6(8) and 7-6(10). As an example: "(1) Rafael Nadal def (3) Roger Federer, 6-3, 6-3, 7-6(10)".

With respect to a tiebreaker exception, there are no tiebreakers in the final set (third set for the Ladies and fifth set for the Gentlemen) for the Australian Open, French Open and Wimbledon. Accordingly, a match could go as many sets until a player wins the set by two games. As an example: "(1) Rafael Nadal def (3) Roger Federer 5-7, 7-6(6), 7-6(5), 3-6, 16-14".

College Softball (Women) and College Baseball (Men)

The college softball and baseball tickers may look similar to MLB scores. The college softball world series and college baseball world series may consist of double elimination tournaments with 15-17 total games played among the 8 teams in the tournament. Further, Women's College World Series games are through 7 innings unless it requires extra innings to decide the game. College baseball World Series games are through 9 innings unless it requires extra innings to decide the game. NCAA school names may be entered by an Editorial group in a Sports Data Management System. On-air names for the different tickers may also differ (e.g., for easy selection and use).

Additional tickers may be used for the little league world series and/or other televised tournaments.

Soccer

The ticker may also be used in soccer tournaments and games such as the World Cup, Champions League, Premier League, etc. A ticker for a given tournament may look similar to the ticker for other soccer scores. FIFA country names may be entered in a Sports Data Management System.

DrawBridge

A drawbridge application is an application that bridges the DATAHIVE server 106 and the real-time compositing/rendering engines (e.g., the VIZRT engine). Such a drawbridge application may simply query the DATAHIVE server 106 and populate shared memory of a rendering engine with the latest data. Systems may reside on all control room rendering/compositing engines.

Figure 10:
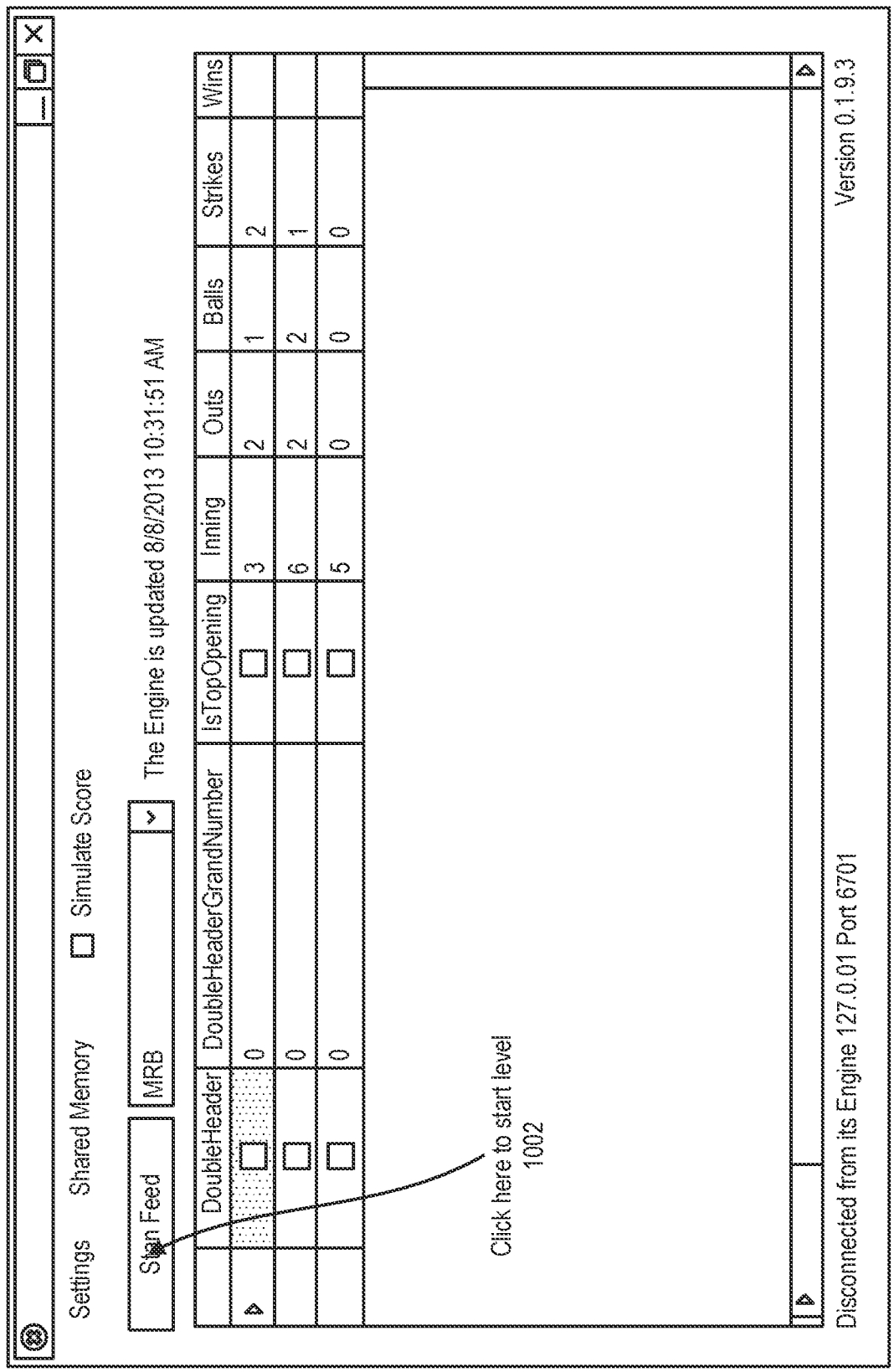
FIG. 10 illustrates a graphical user interface for a DRAW-BRIDGE application that may be utilized in accordance with one or more embodiments of the invention.

FIG. 10 illustrates a graphical user interface for the DRAWBRIDGE application that may be utilized in accordance with one or more embodiments of the invention. Within the graphical user interface, the user has the option 1002 of starting/stopping the feed that will be composited with the live on-air broadcast in real-time.

Logical Flow

FIG. 11 is a flow chart illustrating the logical flow for providing information during a live broadcast in accordance with one or more embodiments of the invention.

At step 1102, one or more information feeds are ingested, via a plug-in architecture, into an application server. The information feeds include attributes and values for the attributes.

At step 1104, the application server drives the one or more information feeds (e.g., from different sources) into a database. To enable efficient access and consistent storage in the database, the information feeds may be normalized for storage in the database. In one or more embodiments, the database may be a document-oriented database, and the attributes and values are stored in object(s) in the document-oriented database. Each of the objects in the document-oriented database may be associated with an object in the application server. In addition, the object(s) may be stored in the document-oriented database as a hierarchical data model. To track the different objects, the application server may generate and maintain a correlation identification (ID) that identifies each object and each object's relationship within the hierarchical data model. The application server uses the correlation ID to traverse the hierarchical relationship of the objects.

The database used to store the objects/information in the information feeds may be a local/on premises database with a backup provided via one or more cloud based databases. The multiple databases (e.g., local and cloud based) may enable parallel processing.

At step 1106, the application server distributes the attributes to a web server.

At step 1108, the web server exposes, using a web service, the attributes to one or more clients. Such a web service enables the selection of a set of the attributes, and the configuration, for visual display, of the values corresponding to the selected set of the attributes.

At step 1110, the values are composited, based on the configuration, in real-time with live audio-video content. The composited elements and live audio-video content are live broadcast. In particular embodiments, the values may be real-time sports statistics for the live audio-video content. Further, the compositing may provide on-air graphics for the live-broadcast.

CONCLUSION

This concludes the description of the preferred embodiment of the invention. The following describes some alternative embodiments for accomplishing the present invention. For example, any type of computer, such as a mainframe, minicomputer, or personal computer, or computer configuration, such as a timesharing mainframe, local area network, or standalone personal computer, could be used with the present invention.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method for use by an application server, the method comprising:
   receiving, by a hardware processor of the application server, one or more information feeds including attributes and one or more values for the attributes;
   driving, by the hardware processor, the one or more information feeds into a database, wherein the database stores the attributes and the one or more values in one or more objects as a hierarchical data model, and wherein each of the one or more objects in the database is associated with an object in the application server;
   generating and maintaining, by the hardware processor, a correlation identification (ID) that identifies each of the one or more objects in the application server and a hierarchical relationship between the one or more objects in the hierarchical data model;
   using, by the hardware processor, the correlation ID to traverse the hierarchical relationship between the one or more objects to obtain one or more of the attributes; and
   distributing, by the hardware processor, the one or more of the attributes.

2. The method of claim 1, wherein the one or more values comprise statistics for live audio-video content.

3. The method of claim 2, wherein the statistics include real-time sports statistics.

4. The method of claim 1, wherein the distributing distributes the one or more of the attributes to a web server, and the method further comprising:
   streaming, by the web server using a web service, the one or more of the attributes to one or more clients.

5. The method of claim 4, wherein the streaming provides a ticker stream to the one or more clients.

6. The method of claim 1, wherein the distributing distributes the one or more of the attributes to a web server of a social media network.

7. The method of claim 1, further comprising:
   selecting a set of the distributed one or more of the attributes;
   obtaining corresponding one or more of the values for the selected set of the distributed one or more of the attributes; and
   compositing the corresponding one or more of the values with audio-video content.

8. The method of claim 7, wherein the compositing provides on-air graphics for a live-broadcast.

9. An application server comprising:
   a processor configured to:
      receive one or more information feeds including attributes and one or more values for the attributes;
      drive the one or more information feeds into a database, wherein the database stores the attributes and the one or more values in one or more objects as a hierarchical data model, and wherein each of the one or more objects in the database is associated with an object in the application server;
      generate and maintain a correlation identification (ID) that identifies each of the one or more objects in the application server and a hierarchical relationship between the one or more objects in the hierarchical data model;
      use the correlation ID to traverse the hierarchical relationship between the one or more objects to obtain one or more of the attributes; and
      distribute the one or more of the attributes.

10. The application server of claim 9, wherein the one or more values comprise statistics for live audio-video content.

11. The application server of claim 10, wherein the statistics include real-time sports statistics.

12. The application server of claim 9, wherein the hardware processor is configured to distribute the one or more of the attributes to a web server, and wherein the one or more of the attributes are streamed, by the web server using a web service, to one or more clients.

13. A method for use by an application server, the method comprising:
   receiving, by a hardware processor of the application server, one or more information feeds including attributes and one or more values for the attributes;
   driving, by the hardware processor, the one or more information feeds into a database, wherein the database stores the attributes and the one or more values in one or more objects as a hierarchical data model;
   generating and maintaining, by the hardware processor, a correlation identification (ID) outside of the database, wherein the correlation ID identifies each of the one or more objects in the application server and a hierarchical relationship between the one or more objects in the hierarchical data model;
   using, by the hardware processor, the correlation ID to traverse the hierarchical relationship between the one or more objects to obtain one or more of the attributes; and
   distributing, by the hardware processor, the one or more of the attributes.

14. The method of claim 13, wherein the one or more values comprise statistics related to live audio-video content.

15. The method of claim 14, wherein the statistics include real-time sports statistics.

16. The method of claim 13, wherein the distributing distributes the one or more of the attributes to a web server, and the method further comprising:
   streaming, by the web server using a web service, the one or more of the attributes to one or more clients.

17. The method of claim 16, wherein the streaming provides a ticker stream to the one or more clients.

18. The method of claim 13, wherein the distributing distributes the one or more of the attributes to a web server of a social media network.

19. The method of claim 13, further comprising:
   selecting a set of the distributed one or more of the attributes;
   obtaining corresponding one or more of the values for the selected set of the distributed one or more of the attributes; and
   compositing the corresponding one or more of the values with audio-video content.

20. The method of claim 19, wherein the compositing provides on-air graphics for a live-broadcast.

* * * * *